United States Patent
Nakamura et al.

(10) Patent No.: US 8,269,397 B2
(45) Date of Patent: Sep. 18, 2012

(54) VIBRATORY DRIVING DEVICE

(75) Inventors: Taketo Nakamura, Sakai (JP); Tomoyuki Yuasa, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 278 days.

(21) Appl. No.: 12/840,580

(22) Filed: Jul. 21, 2010

(65) Prior Publication Data

US 2011/0018393 A1    Jan. 27, 2011

(30) Foreign Application Priority Data

Jul. 27, 2009 (JP) ................................. 2009-174044

(51) Int. Cl.
*H01L 41/08* (2006.01)
(52) U.S. Cl. .................................. 310/317; 310/316.01
(58) Field of Classification Search ............... 310/316.1, 310/317
See application file for complete search history.

(56) References Cited

U.S. PATENT DOCUMENTS 5,907,212 A * 5/1999 Okada .......................... 310/328
7,750,534 B2 * 7/2010 Noda et al. ............... 310/316.01
2001/0026112 A1 * 10/2001 Yoshida et al. ............... 310/328
2006/0082253 A1 * 4/2006 Hara ............................. 310/317
2010/0296184 A1 * 11/2010 Shibatani ..................... 359/824

FOREIGN PATENT DOCUMENTS

JP    2000-205809 A    7/2000
JP    2006-091208 A    4/2006

* cited by examiner

*Primary Examiner* — Thomas Dougherty
(74) *Attorney, Agent, or Firm* — Brinks Hofer Gilson & Lione

(57) ABSTRACT

A vibratory driving device (1) comprising an electromechanical transducer (3) which causes mechanical displacement according to an applied voltage, a driving shaft (4) which is held so as to be displaced in its axial direction by the electromechanical transducer and which is provided on its surface with two resistive bodies (8) extending in the axial direction and connected to the electromechanical transducer at one end, a movable member (5) which slidably engages on the driving shaft so as to contact with the two resistive bodies to connect electrically the contacted points of the resistive bodies each other, a driving circuit (13) which applies a periodical driving voltage to the electromechanical transducer, and a measuring circuit (15) which measures electric resistance between the two resistive bodies can determine a position of the movable member and has a simplified wiring (7) with low risk of disconnection.

11 Claims, 10 Drawing Sheets

VIBRATORY DRIVING DEVICE

This application is based on application No. 2009-174044 filed in Japan, the contents of which are hereby incorporated by reference.

FIELD OF THE INVENTION

The present invention relates to a vibratory driving device.

DESCRIPTION OF THE RELATED ART

For a vibratory driving device which oscillating a driving shaft with an electromechanical transducer to slidingly displace a movable member frictionally engaging on the driving shaft, JP-2000-205809-A and JP-2006-91208-A describe techniques in which the driving shaft consists of an resistive body and the movable member is used as an electric contact sliding on the resistive body, wherein a electric resistance between one end of the driving shaft and the movable member is measured to determine a position of the movable member.

In these vibratory driving devices, it is required to connect conductive leads to the end of the driving shaft and the movable member so as to enable measuring a electric resistance between the end of the shaft and the movable member, in addition to the wiring for applying a driving voltage to the electromechanical transducer. Therefore, the wiring work is complicated in the vibratory driving device. Further, particularly the lead connected to the movable member is largely deformed due to the displacement of the movable member, and therefore the lead is at risk for disconnecting and breaking.

SUMMARY OF THE INVENTION

In view of the above problems, an object of the present invention is to provide a vibratory driving device which can determine a position of a movable member and in which the wiring is simplified with low risk of disconnection.

In order to achieve the objects of the present invention, there is provided a vibratory driving device comprising an electromechanical transducer which causes mechanical displacement according to an applied voltage, a driving shaft which is held so as to be displaced in its axial direction by the electromechanical transducer and which is provided on its surface with two resistive bodies extending in the axial direction, a movable member which slidably engages on the driving shaft so as to contact with the two resistive bodies to connect electrically the contacted points of the resistive bodies each other, a driving circuit which applies a periodical driving voltage to the electromechanical transducer, and a measuring circuit which measures electric resistance between the two resistive bodies.

With this configuration, a position of the movable member can be calculated with measuring a resistance of a series circuit consisting of the two partial resistances of the resistive body in portions from the end to the movable member and the internal resistance of the movable member. According to the present invention, it is not required to wire to the largely displacing movable member. Therefore, the wiring is not exerted any strong stress, hence the vibratory driving device according to the present invention has a reduced risk of disconnection of the wiring.

Further, in the vibratory driving device according to the present invention, the two resistive bodies may be electrically connected to electrodes of the electromechanical transducer respectively.

With this configuration, the wiring for connecting the driving circuit serves as a wiring for connecting the measuring circuit and the resistive body. Therefore, only two wires are required to be wired to the vibratory driving device.

Further, in the vibratory driving device according to the present invention, the resistive bodies may be made of resistive material applied beyond the drive shaft to the electromechanical transducer.

With this configuration, forming of the resistive body and connecting the resistive body to the electromechanical transducer can be simultaneously carried out. Therefore, required production step is reduced. Moreover, this configuration significantly reduces the risk of a disconnection between the resistive body and the electromechanical transducer.

Further, in the vibratory driving device according to the present invention, a predetermined conductive portion of the movable member may contact with the resistive body at a point.

With this configuration, an electrically dividing point of the resistive body by the movable member is precisely defined according to the position of the movable member, hence the accuracy of the position measurement of the movable member is high.

Further, in the vibratory driving device according to the present invention, the movable member may engage with a portion of the driving shaft where the resistive body is not provided, and the movable member may have a blush slidingly contacting with the resistive body.

With this configuration, since the movable member engages with a portion where the resistive body is not provided, the displacing amount and the moving torque are stable. And, by arranging the brush in contact with the resistive body with a weak pressure, an attrition of the resistive body is prevented, and therefore a degrading of the measuring accuracy is prevented. Further, if a brush having a small contacting area is used, the electrically dividing point of the resistive body is secure so as to enhance the measuring accuracy of the position of the movable member.

Further, in the vibratory driving device according to the present invention, the driving shaft may be covered with an insulating material and the resistive body may be formed on the insulating material.

With this configuration, the driving shaft can be made from a conductive material.

Further, in the vibratory driving device according to the present invention, the measuring circuit may measure a current when the driving circuit applies a direct-current voltage to the electromechanical transducer.

With this configuration, the current of the electromechanical transducer is steady, and therefore any change in current value due to change of the partial resistance of the resistive body can be easily measured.

Further, in the vibratory driving device according to the present invention, the measuring circuit may measure an average value of the current when the driving circuit applies the driving voltage to the electromechanical transducer.

With this configuration, the measured current value is shifted by offset value proportional to the partial resistance of the resistive body with respect to the driving voltage. Therefore, the offset value is easily calculated by averaging the measured current value.

Further, in the vibratory driving device according to the present invention, the measuring circuit may measure a peak value of the current when the driving circuit applies the driving voltage to the electromechanical transducer.

With this configuration, a value of the inrush current is changed according to the partial resistance of the resistive body, therefore the position of the movable member is easily calculated by picking up the peak value of the current.

Further, in the vibratory driving device according to the present invention may further comprise a controller which calculates the position of the movable member based on the electric resistance between the two resistive bodies measured by the measuring circuit.

With this configuration, the vibratory driving device independently calculates the position of the movable member.

In accordance with the present invention, a calculation of the position of the movable member is enabled by forming the two resistive bodies on the driving shaft, by electrically dividing the two resistive bodies with the movable member, and by measuring the series resistance of the partial resistance of the two resistive bodies. Therefore, the movable member is not needed to be wired. Hence the vibratory driving device according to the present invention can be produced with a simple wiring operation and has no risk of disconnecting.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
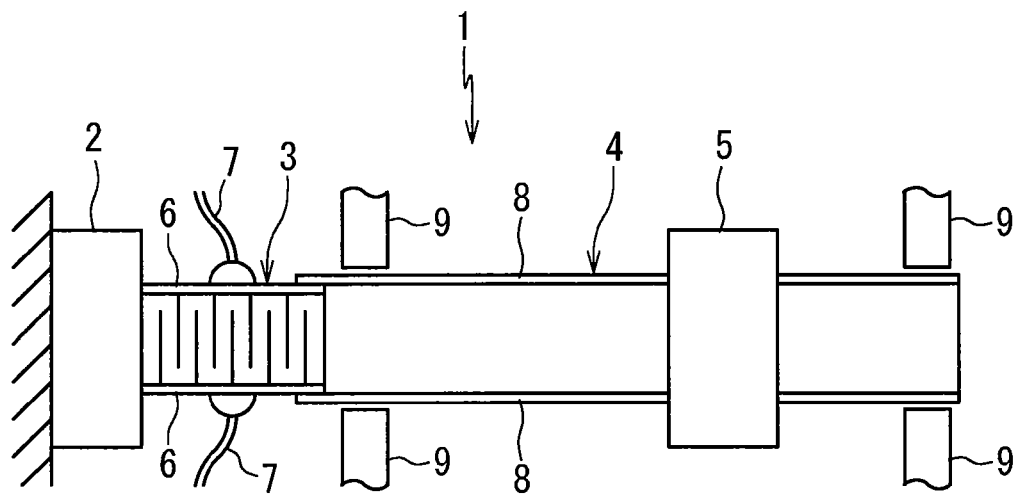
FIG. 1 is a schematic view of a vibratory driving device of first embodiment according to the present invention.

FIG. 1 shows a vibratory driving device 1 as first embodiment according to the present invention. The vibratory driving device 1 comprises a weight 2 which is fixed to a chassis or like of an equipment, a piezoelectric element (electromechanical transducer) 3 of which one end in its elongating direction is held by the weight 2, a driving shaft 4 of which one end is held by the other end of the piezoelectric element 3, and a movable member 5 which frictionally engages slidably on the driving shaft 4.

The piezoelectric element 3 is formed by stacking up a plurality of layers of piezoelectric material with interposition of electrode layers and has external electrodes 6 the every other electrode layers on both sides. To the external electrodes 6, conductive leads 7 are connected respectively.

The driving shaft 4 has a columnar form with a diameter same with the width of the piezoelectric element 3. For instance, the driving shaft 4 is formed by consolidating glass fibers with resin. And, the driving shaft 4 is provided on the both side surfaces respectively with resistive bodies 8 which are formed by applying resistive paint material in linear form with constant width and thickness in the axial direction of the driving shaft 4. Further, the Driving shaft 4 is supported by guide members 9 slidably in the axial direction.

Figure 2:
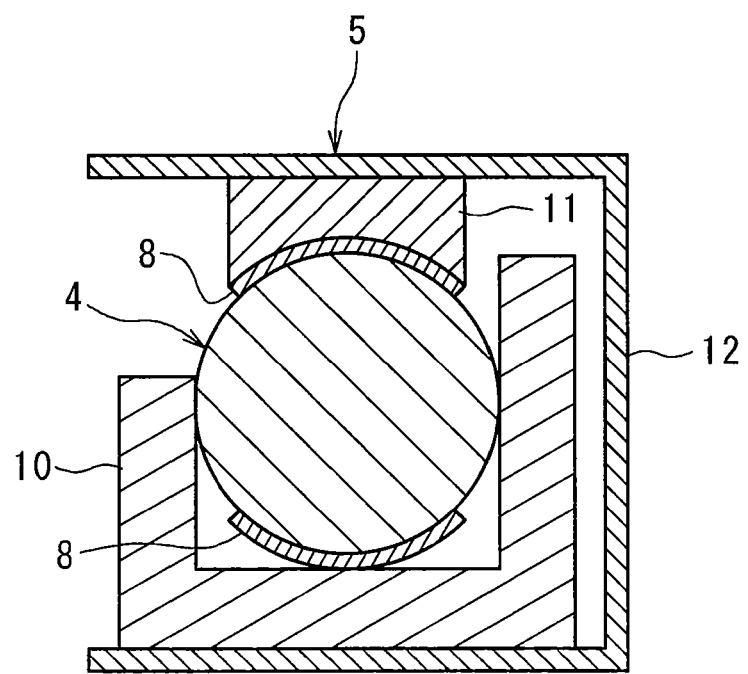
FIG. 2 is a sectional view of the vibratory driving device in FIG. 1.

FIG. 2 shows a configuration of the movable member 5. The movable member 5 consists of a main body 10 which receives the driving shaft 4 and which is formed, for instance, from metallic material such as zinc, a cap member 11 which press the driving shaft 4 to the main body 10 and which is formed, for instance, from metallic material such as stainless steel, and a spring member 12 which clamps the main body 10 and the cap member 11 and which is formed, for instance, from beryllium copper.

The main body 10 and the cap member 11 respectively contact at a point with the resistive body 8 of the driving shaft 4 to short circuit between the two contacting points of the resistive bodies 8 via the spring member 12.

Figure 3:
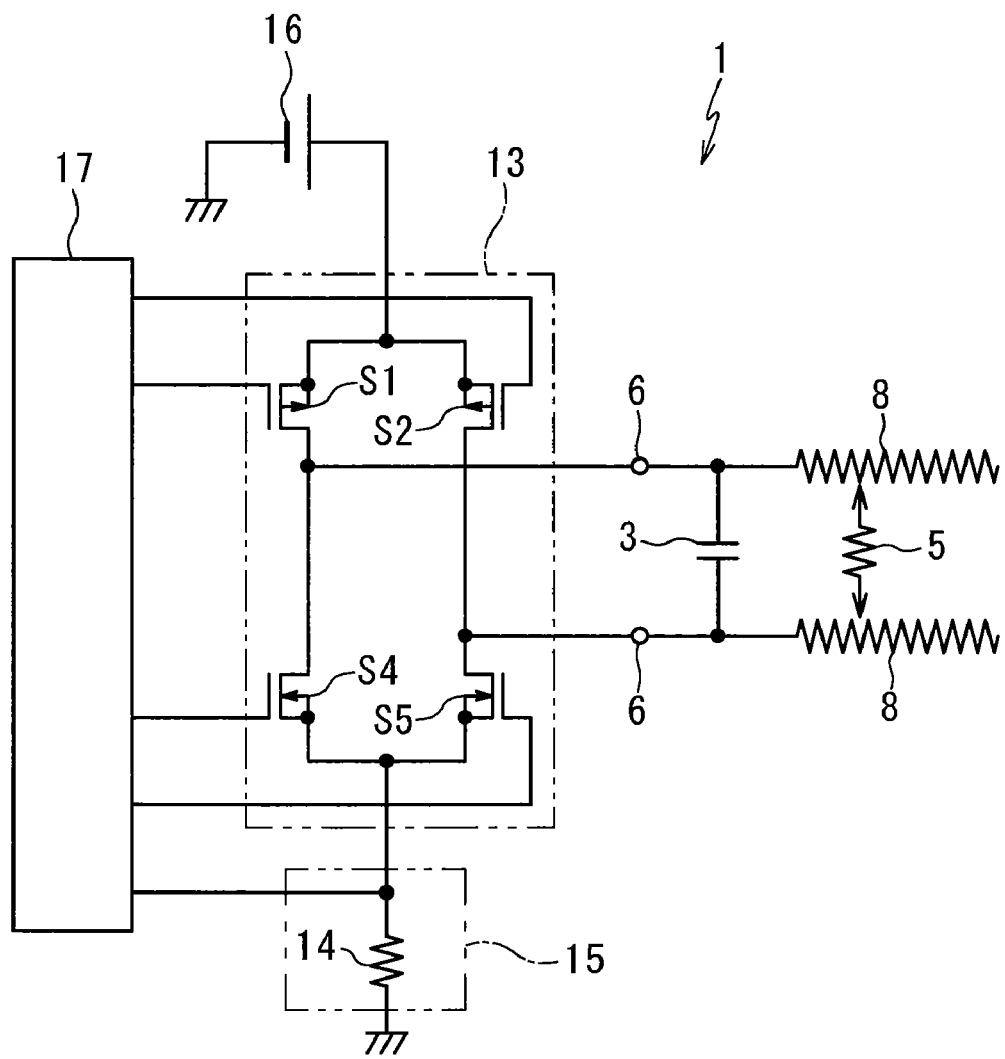
FIG. 3 is a circuit diagram of the vibratory driving device in FIG. 1.

FIG. 3 shows a circuit configuration of the vibratory driving device 1. The vibratory driving device 1 has a driving circuit which applies a driving voltage between the two external electrodes 6 of the piezoelectric element 3, and a measuring circuit 15 which is provided with a measuring resistance 14 for measurement of a current of the driving circuit 13.

The resistive bodies 8 of the driving shaft 4 are electrically divided by the movable member 5. It is appropriate that the resistive bodies 8 have a resistance from several kilo ohms to several dozen of kilo ohms as a whole. An internal resistance of the movable member 5 is illustrated in FIG. 3, but the internal resistance of the movable member 5 in this embodiment is substantially ignorable.

The driving circuit 13 is a full-bridge circuit which has four switching elements S1, S2, S3, S4 and which connects one of the external electrodes 6 of the piezoelectric element 3 to a direct-current source 16 and connects other of the external electrodes 6 to the ground by turning on the switching elements S1, S4 or the switching elements S2, S3. The switching elements S1, S2, S3, S4 are turned on and off by the controller 17.

The driving circuit 13 applies a driving voltage in which the polarity is turned over periodically, by alternately turning on the switching element S1, S4 and the switching element S2, S3 cyclically. By controlling the duty ratio of this driving voltage, the driving shaft can be oscillated in an asymmetrical manner so as to displace slidably the movable member 5 on the driving shaft 4 in a desired direction.

The measuring circuit 15 measures a grounding current of the driving circuit 13 transformed into a voltage by the measuring resistance 14, with the switching element S1, S4 of the driving circuit 13 turned on continuously to apply a direct-current voltage between the external electrodes 6. In this embodiment, the measuring resistance 14 has a resistance around 200 ohms. And the measured voltage by the measuring circuit 15 is converted into digital and thereby recognized by the controller 17.

Since the piezoelectric element 3 can be assumed electrically as a capacitor, a direct current resistance between the external electrodes 6 is a resistance between the external electrodes 6 side ends of the resistive bodies 8 on the driving shaft 4, that is sum of the partial resistances on the piezoelectric element 3 side among the partial resistances of the two resistive bodies 8 divided by the movable member 5.

In this embodiment, the surface resistance value of the resistive bodies 8 between the external electrodes 6 (resistance value of the partial resistances connected in series) is about 3 kilo ohms when the movable member 5 is positioned at the closest position to the piezoelectric element 3, and is about 15 kilo ohms when the movable member 5 is positioned at the closest position to the distal end (opposite side to the piezoelectric element 3) of the driving shaft 4.

Figure 4:
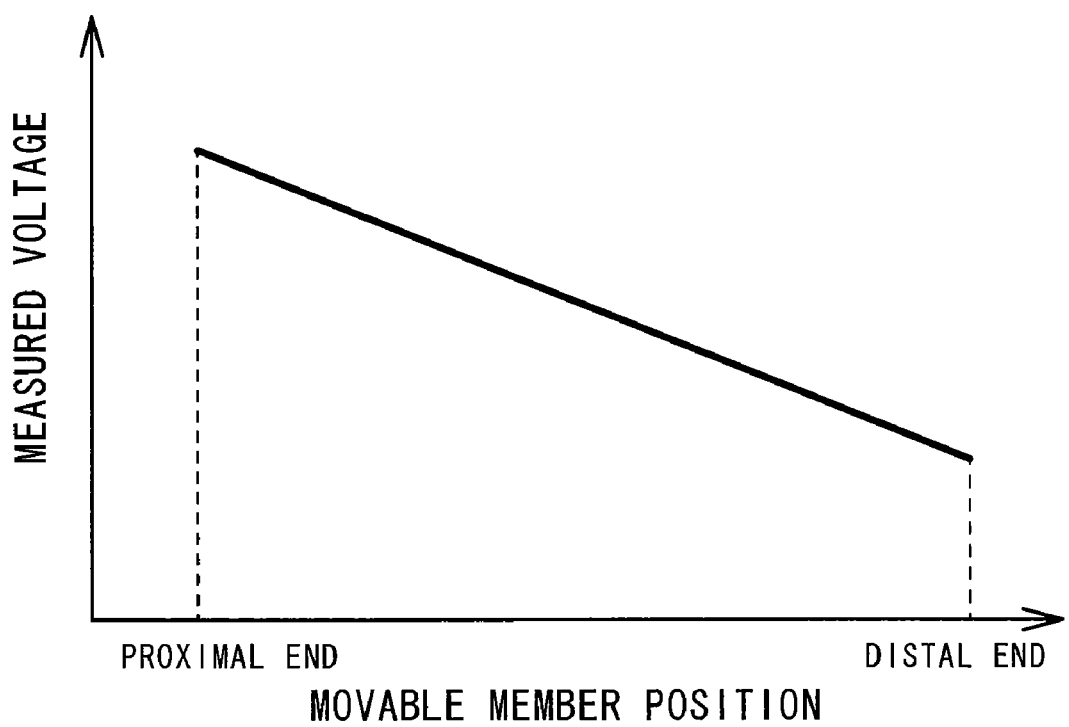
FIG. 4 is a chart showing measured voltage depending on a position of the movable member in the vibratory driving device in FIG. 1.

The partial resistances of the resistive bodies 8 increases in proportional to the position of the movable member. Therefore, as shown in FIG. 4, the measured voltage by the measuring circuit 15 has a negative proportional relation with the position of the movable member 5. Accordingly, the controller 17 can calculate the position of the movable member 5 easily based on the measured voltage by the measuring circuit 15.

Figure 5:
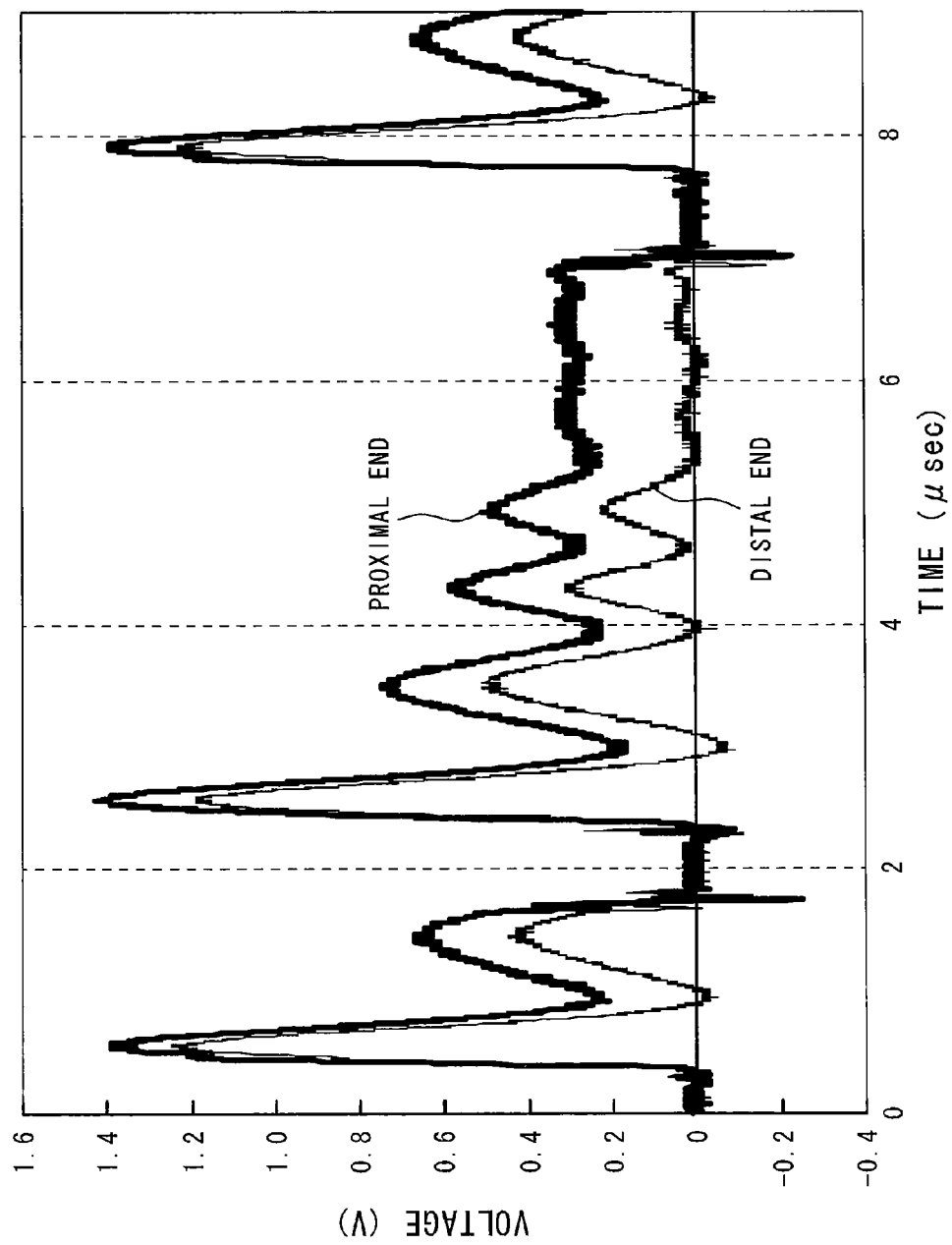
FIG. 5 is a chart showing a waveform of measured voltages in the vibratory driving device in FIG. 1.

FIG. 5 shows measured voltages by the measuring circuit 15 when the periodical driving voltage is applied to displace slidingly the movable member 5 on the driving shaft 4. In the chart, one cycle time of the driving voltage is about 7.5 msec, and the shown measured voltages are respectively in the case where the movable member 5 is located the position closest to the piezoelectric element 3 (proximal end) and in the case where the movable member 5 is located the position farthest from the piezoelectric element 3 (distal end).

As shown in the chart, when the movable member 5 is positioned in the side of the piezoelectric element 3, the grounding current of the driving circuit 13 is high. Therefore, the controller 17 can determine the position of the movable member 5 by integrating the measured voltage and calculating an average value of the measured voltage. In this embodiment, the average value of the measured voltage by the measuring circuit 15 is 0.39 V when the movable member 5 is located at the closest position to the piezoelectric element 3, and the average value of the measured voltage by the measuring circuit 15 is 0.19 V when the movable member 5 is located at the farthest position from the piezoelectric element 3.

Alternatively, since the peak value of the grounding current of the driving circuit 13 changes, the peak value may be measured to calculate the position of the movable member 5. In this embodiment, the peak value of the measured voltage by the measuring circuit 15 is 1.39 V when the movable member 5 is located at the closest position to the piezoelectric element 3, and the peak value of the measured voltage by the measuring circuit 15 is 1.25 V when the movable member 5 is located at the farthest position from the piezoelectric element 3.

Figure 6:
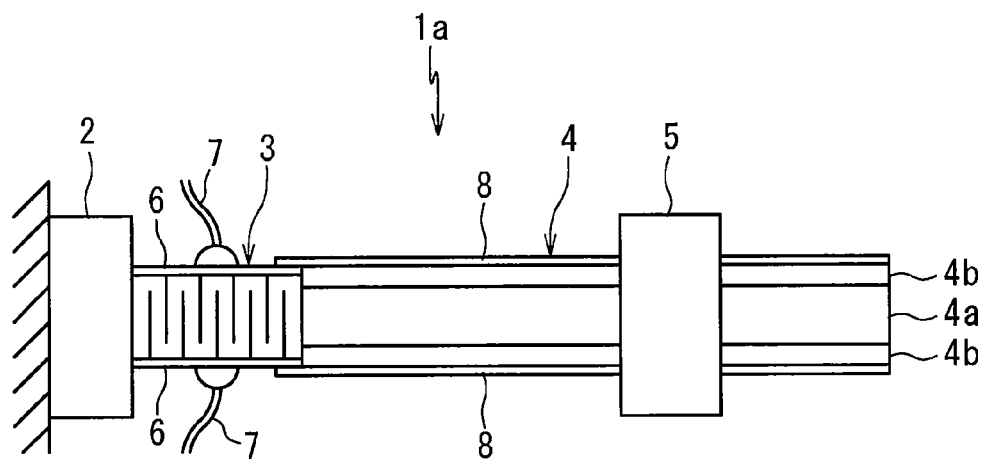
FIG. 6 is a schematic view of a vibratory driving device of second embodiment according to the present invention.

FIG. 6 shows a vibratory driving device 1a as second embodiment according to the present invention. It is to be noted that in the following description of the preferred embodiment of the present invention, components identical to those described before are designated by identical reference numerals to omit redundant explanation. In the vibratory driving device 1a as this embodiment, the driving shaft 4 consists of a shaft-like carbon solid 4a provided with a insulating layer 4b made of PPS resin on surface and with the resistive bodies 8 on the insulation layer 4b. As this embodiment, to make the driving shaft from a conductive material, an electrical insulation between the two resistive bodies should be ensured by providing the insulating layer 4b.

Figure 7:
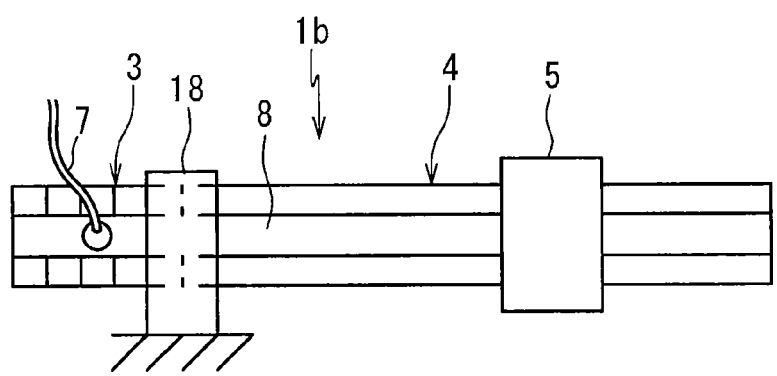
FIG. 7 is a schematic view of a vibratory driving device of third embodiment according to the present invention.
Figure 8:
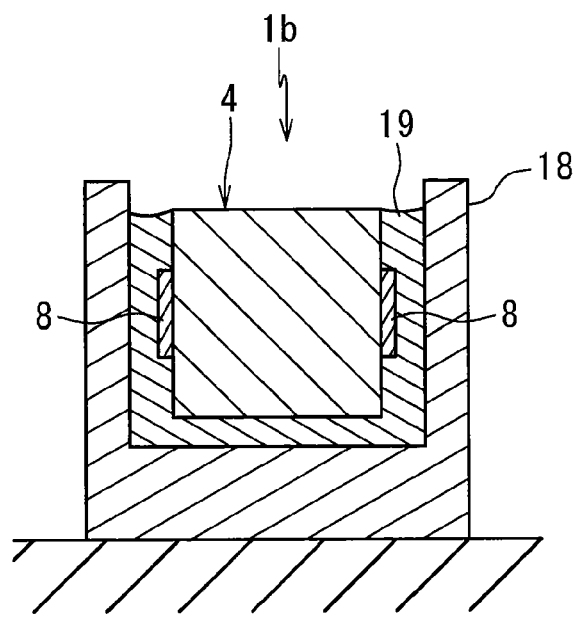
FIG. 8 is a sectional view of the vibratory driving device in FIG. 7.

FIG. 7 shows a vibratory driving device 1b as second embodiment according to the present invention. In the vibratory driving device 1b as this embodiment, the connected portion of the piezoelectric element 3 and the driving shaft 4 is supported by the supporting member 18. As shown in FIG. 8, supporting member 18 surrounds three directions of the circumference of the piezoelectric element 3 to hold the piezoelectric element 3 and the driving shaft 4 with adhesive 19. The resistive body 8 and the supporting member 18 can contact each other, depending on the condition of the assembling of the vibratory driving device 1b. Accordingly, the supporting member 18 should be made from an insulating material to prevent the resistive bodies 8 from short circuiting.

Figure 9:
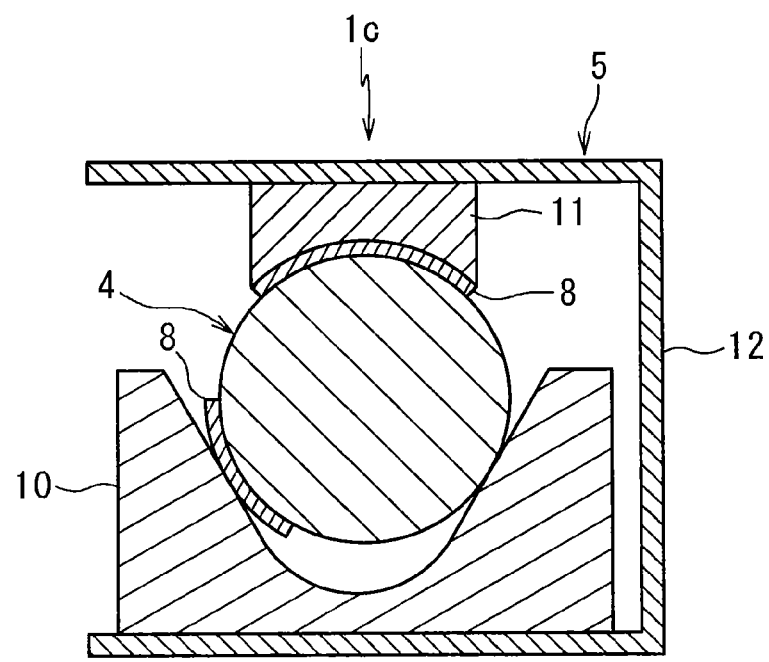
FIG. 9 is a schematic view of a vibratory driving device of fourth embodiment according to the present invention.

FIG. 9 shows a vibratory driving device 1c as third embodiment according to the present invention. As this embodiment suggests, surfaces of the main body 10 and the cap member 11 may have any shape for a surface contacting with the driving shaft 4. Also, if the resistive bodies 8 are insulated each other and can be divided by the movable member 5, the resistive bodies 8 may be provided in any arrangement.

Figure 10:
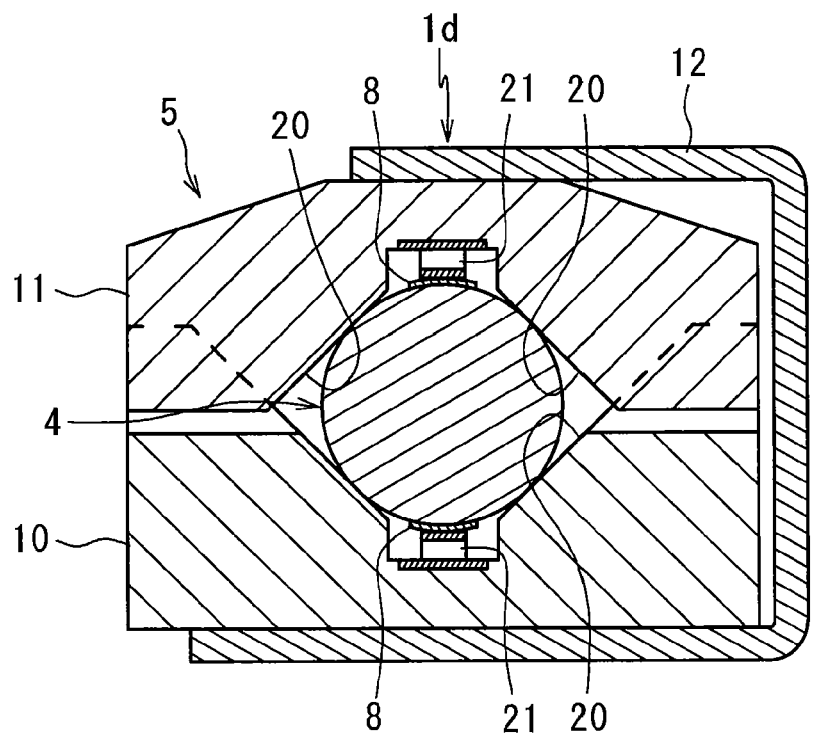
FIG. 10 is a schematic view of a vibratory driving device of fifth embodiment according to the present invention.
Figure 11:
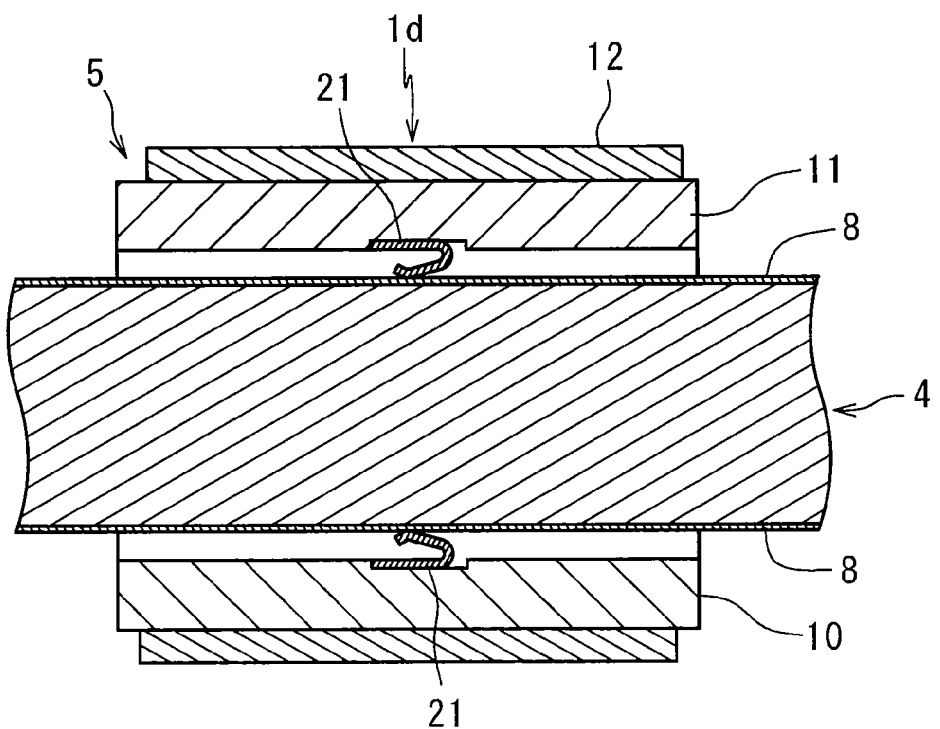
FIG. 11 is an axial sectional view of the vibratory driving device in FIG. 10.

FIGS. 10 and 11 show a vibratory driving device 1d as fifth embodiment according to the present invention. In the vibratory driving device 1d as this embodiment, the movable member 5 and the main body 10 are formed, for instance, by machining of the stainless steel, so as to have respectively two inclined faces 20 slidingly contacting with the driving shaft. Each inclined face 20 is arranged to contact with the portion of the driving shaft 4 where the resistive bodies 8 are not formed.

Further, the main body 10 and the cap member 11 respectively provided with a brush 21 which contacts slidingly to the resistive body 8 formed on the driving shaft 4 between the two inclined faces 20. For instance, the brush 21 is made of a thin plate of beryllium cupper. And the contacting pressure of the brush 21 to the driving shaft 4 is designed sufficiently weaker in contras with the contacting pressure of the main body 10 and the cap member 11 to the driving shaft 4 caused by the spring member 12.

In this embodiment, since the main body 10 and the cap member 11 of the movable member 5 are frictionally engages with a portion of the driving shaft 4 where the resistive body is not formed, frictional force is stable and therefore the driving speed and the driving torque do not vary. Since the brushes 21 contact with the resistive bodies 8 with a small pressure, the resistive bodies 8 practically are not worn. Therefore, the resistivity of the resistive bodies 8 are not changed, hence the relation between the measured voltage by the measuring circuit 15 and the position of the movable member 5 is not changed. Furthermore, the brushes 21 contact in a point to the resistive bodies 8, and therefore the electrically dividing point of the resistive bodies 8 is precisely defined according to the position of the movable member 5, hence the accuracy of the position measurement of the movable member 5 is improved.

Figure 12:
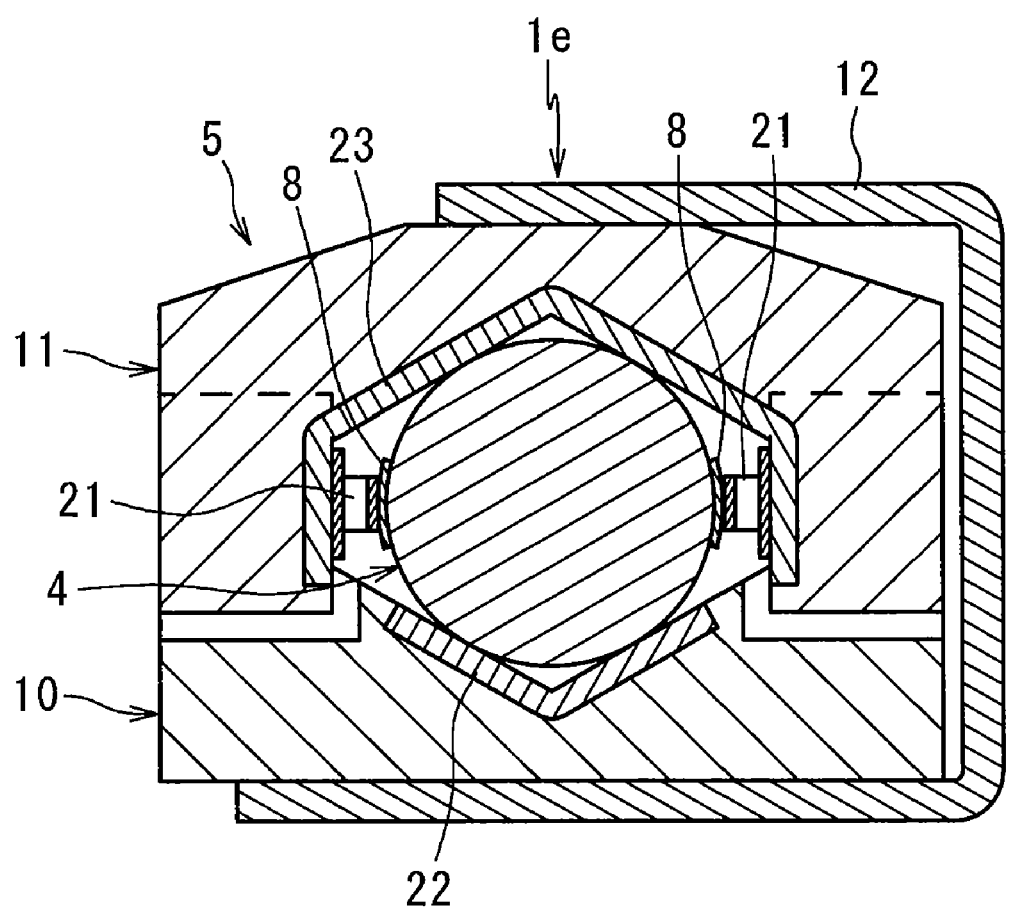
FIG. 12 is a schematic view of a vibratory driving device of sixth embodiment according to the present invention.

FIG. 12 shows a vibratory driving device 1e as sixth embodiment according to the present invention. In the vibratory driving device 1e as this embodiment the main body 10 and the cap member 11 of the movable member 5 are, for instance, formed by injection molding with PPS and respectively integrated metallic members 22, 23 which is made of pressed stainless steel and form the two inclined faces 20 slidingly contacting with the driving shaft 4, since the metallic members 22, 23 has inserted into the molds when the injection molding.

The metallic member 23 of the cap member 11 extends partially to lateral sides to hold the brushes 21 which slidingly contact to the resistive bodies 8 of the driving shaft 4 respectively. In this embodiment, the metallic member 23 of the cap member 11 and two brushes 21 divide the resistive bodies 8 and short circuit between the divided points. Therefore, the main body 10, the cap member 11 and the spring member 12 is not needed to be completely conductive, and can be made from an advantageous material chosen in view of mechanical property and workability.

Figure 13:
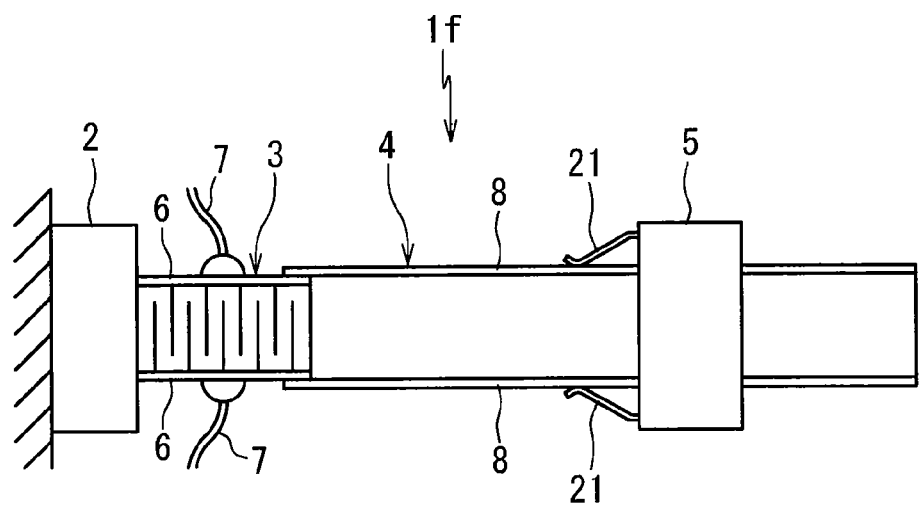
FIG. 13 is a schematic view of a vibratory driving device of seventh embodiment according to the present invention.

FIG. 13 shows a vibratory driving device 1f as seventh embodiment according to the present invention. In the vibratory driving device 1f as this embodiment, the brushes 21 are laterally protruding from the movable member 5. With employing this configuration of the brushes 21, while keeping a basic design of the movable member of a conventional vibratory driving device, a configuration according the present invention so as to divide two resistive bodies respectively and to connect the resulted partial resistances can be achieved, for instance, by inserting the brushes 21 respectively between the main body 10 and the spring member 12 and between the cap member 11 and the spring member 12.

Figure 14:
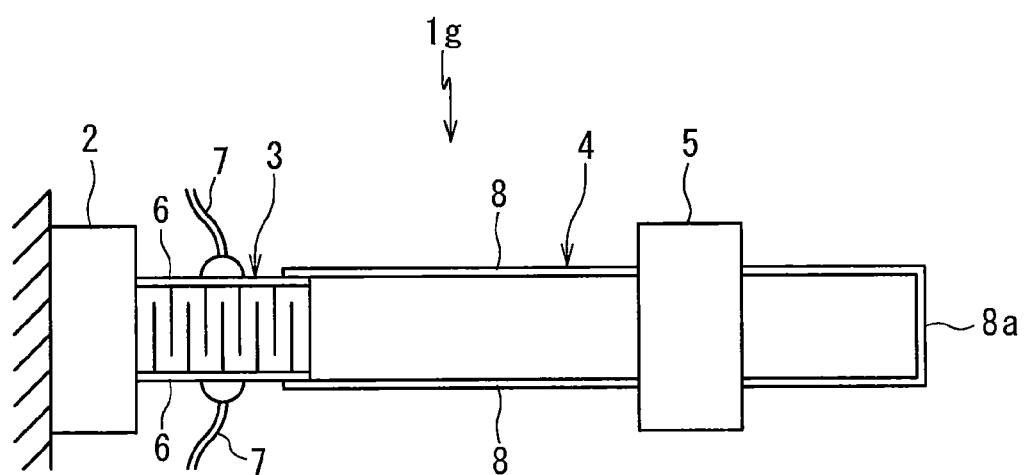
FIG. 14 is a schematic view of a vibratory driving device of eighth embodiment according to the present invention.

Further FIG. 14 shows a vibratory driving device 1g as eighth embodiment according to the present invention. In the vibratory driving device 1g as this embodiment, the two resistive bodies 8 are connected each other through a resistive body 8a which is formed on the distal end of the driving shaft 4. In the case where the piezoelectric element 3 and the driving shaft 4 is formed in a rectangular columnar shape which is sliced from a plate-like base material, the resistive bodies 8 and the resistive body 8a can be formed by slicing the plate-like base material after dipping in to a resistive paint material.

Figure 15:
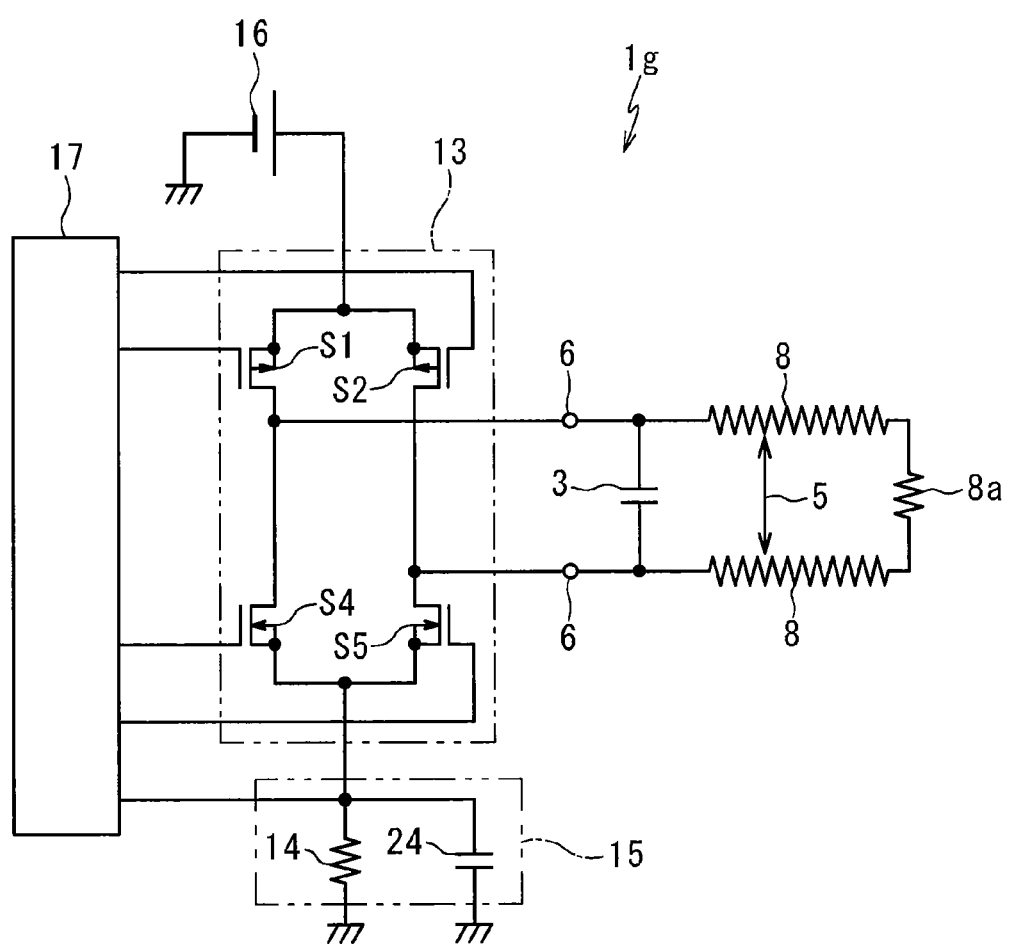
FIG. 15 is a circuit diagram of the vibratory driving device in FIG. 14.

FIG. 15 shows an equivalent circuit of the vibratory driving device 1g as this embodiment. As, the circuit diagram teaches, if the resistance of the movable member 5 can be ignored, the partial resistance of the far side of resistive bodied 8 and the resistance of the resistive body 8a at the distal end of the driving shaft 4 does not influence the grounding current.

The measuring circuit 15 of this embodiment further has a capacitor 24 and therefore is configured as a low pass filter which outputs a voltage representing an average value of the grounding current in an electrical manner. Accordingly, the controller 17 is not required to integrate the outputted voltage from the measuring circuit 15, hence the controller 17 has a reduced arithmetic load.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vibratory driving device comprising
an electromechanical transducer which causes mechanical displacement according to an applied voltage,
a driving shaft which is held so as to be displaced in its axial direction by the electromechanical transducer and which is provided on its surface with two resistive bodies extending in the axial direction,
a movable member which slidably engages on the driving shaft so as to contact with the two resistive bodies to connect electrically the contacted points of the resistive bodies each other,
a driving circuit which applies a periodical driving voltage to the electromechanical transducer, and
a measuring circuit which measures electric resistance between the two resistive bodies.

2. The vibratory driving device according to claim 1, wherein the two resistive bodies are electrically connected to electrodes of the electromechanical transducer respectively.

3. The vibratory driving device according to claim 2, wherein the resistive bodies are made of resistive material applied beyond the drive shaft to the electromechanical transducer.

4. The vibratory driving device according to claim 1, wherein a predetermined conductive portion of the movable member contacts with the resistive body at a point.

5. The vibratory driving device according to claim 1, wherein the movable member engages with a portion of the driving shaft where the resistive body is not provided, and the movable member has a brush slidingly contacting with the resistive body.

6. The vibratory driving device according to claim 1, wherein the driving shaft is covered with an insulating material and the resistive body is formed on the insulating material.

7. The vibratory driving device according to claim 1, wherein the measuring circuit measures a current when the driving circuit applies a direct-current voltage to the electromechanical transducer.

8. The vibratory driving device according to claim 1, wherein the measuring circuit measures an average value of the current when the driving circuit applies the driving voltage to the electromechanical transducer.

9. The vibratory driving device according to claim 1, wherein the measuring circuit measures a peak value of the current when the driving circuit applies the driving voltage to the electromechanical transducer.

10. The vibratory driving device according to claim 1 further comprising a controller which calculates the position of the movable member based on the electric resistance between the two resistive bodies measured by the measuring circuit.

11. The vibratory driving device according to claim 1, wherein the resistive body has a linear form.

* * * * *